US007624169B2

(12) United States Patent
Lisiecki et al.

(10) Patent No.: US 7,624,169 B2
(45) Date of Patent: *Nov. 24, 2009

(54) SCALABLE, HIGH PERFORMANCE AND HIGHLY AVAILABLE DISTRIBUTED STORAGE SYSTEM FOR INTERNET CONTENT

(75) Inventors: Philip A. Lisiecki, Quincy, MA (US); Cosmos Nicolaou, Palo Alto, CA (US); Kyle R. Rose, Cambridge, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 492 days.

This patent is subject to a terminal disclaimer.

(21) Appl. No.: 11/595,230

(22) Filed: Nov. 10, 2006

(65) Prior Publication Data

US 2007/0055765 A1    Mar. 8, 2007

Related U.S. Application Data

(63) Continuation of application No. 10/113,183, filed on Apr. 1, 2002, now Pat. No. 7,472,178.

(60) Provisional application No. 60/280,917, filed on Apr. 2, 2001.

(51) Int. Cl.
*G06F 15/173* (2006.01)
(52) U.S. Cl. ................. 709/223; 709/203; 709/217; 709/218; 709/224; 709/238; 709/248
(58) Field of Classification Search .............. 709/203, 709/217–218, 223–224, 238, 248
See application file for complete search history.

(56) References Cited

U.S. PATENT DOCUMENTS

| 5,799,306 | A | * | 8/1998 | Sun et al. ..................... 707/102 |
| 5,991,809 | A | * | 11/1999 | Kriegsman ................... 709/226 |
| 6,003,030 | A | * | 12/1999 | Kenner et al. ................ 707/10 |
| 6,108,703 | A | * | 8/2000 | Leighton et al. ............. 709/226 |
| 6,119,143 | A | * | 9/2000 | Dias et al. .................... 709/201 |
| 6,128,655 | A | * | 10/2000 | Fields et al. ................. 709/219 |
| 6,144,996 | A | * | 11/2000 | Starnes et al. ............... 709/217 |
| 6,185,598 | B1 | * | 2/2001 | Farber et al. ................. 709/200 |
| 6,212,521 | B1 | * | 4/2001 | Minami et al. ................ 707/10 |
| 6,327,622 | B1 | * | 12/2001 | Jindal et al. .................. 709/228 |
| 6,345,308 | B1 | * | 2/2002 | Abe ............................. 709/248 |
| 6,405,252 | B1 | * | 6/2002 | Gupta et al. ................. 709/224 |
| 6,405,294 | B1 | * | 6/2002 | Hayter ........................ 711/162 |
| 6,415,323 | B1 | * | 7/2002 | McCanne et al. ........... 709/225 |
| 6,484,143 | B1 | * | 11/2002 | Swildens et al. ............... 705/1 |
| 6,502,125 | B1 | * | 12/2002 | Kenner et al. ............... 709/203 |
| 6,553,413 | B1 | * | 4/2003 | Leighton et al. ............. 709/219 |

(Continued)

*Primary Examiner*—Shawki S Ismail
(74) *Attorney, Agent, or Firm*—David H. Judson

(57) ABSTRACT

A method for content storage on behalf of participating content providers begins by having a given content provider identify content for storage. The content provider then uploads the content to a given storage site selected from a set of storage sites. Following upload, the content is replicated from the given storage site to at least one other storage site in the set. Upon request from a given entity, a given storage site from which the given entity may retrieve the content is then identified. The content is then downloaded from the identified given storage site to the given entity. In an illustrative embodiment, the given entity is an edge server of a content delivery network (CDN).

6 Claims, 5 Drawing Sheets

U.S. PATENT DOCUMENTS

| | | | |
|---|---|---|---|
| 6,606,643 B1 * | 8/2003 | Emens et al. | 709/203 |
| 6,665,706 B2 * | 12/2003 | Kenner et al. | 709/203 |
| 6,687,846 B1 * | 2/2004 | Adrangi et al. | 714/4 |
| 6,694,358 B1 * | 2/2004 | Swildens et al. | 709/218 |
| 6,754,699 B2 * | 6/2004 | Swildens et al. | 709/217 |
| 6,754,706 B1 * | 6/2004 | Swildens et al. | 709/225 |
| 6,769,030 B1 * | 7/2004 | Bournas | 709/233 |
| 6,772,396 B1 * | 8/2004 | Cronin et al. | 715/202 |
| 6,820,133 B1 * | 11/2004 | Grove et al. | 709/238 |
| 6,857,012 B2 * | 2/2005 | Sim et al. | 709/222 |
| 7,003,555 B1 * | 2/2006 | Jungck | 709/219 |
| 7,181,523 B2 * | 2/2007 | Sim | 709/226 |
| 7,209,955 B1 * | 4/2007 | Major et al. | 709/207 |
| 2001/0047400 A1 * | 11/2001 | Coates et al. | 709/219 |

* cited by examiner

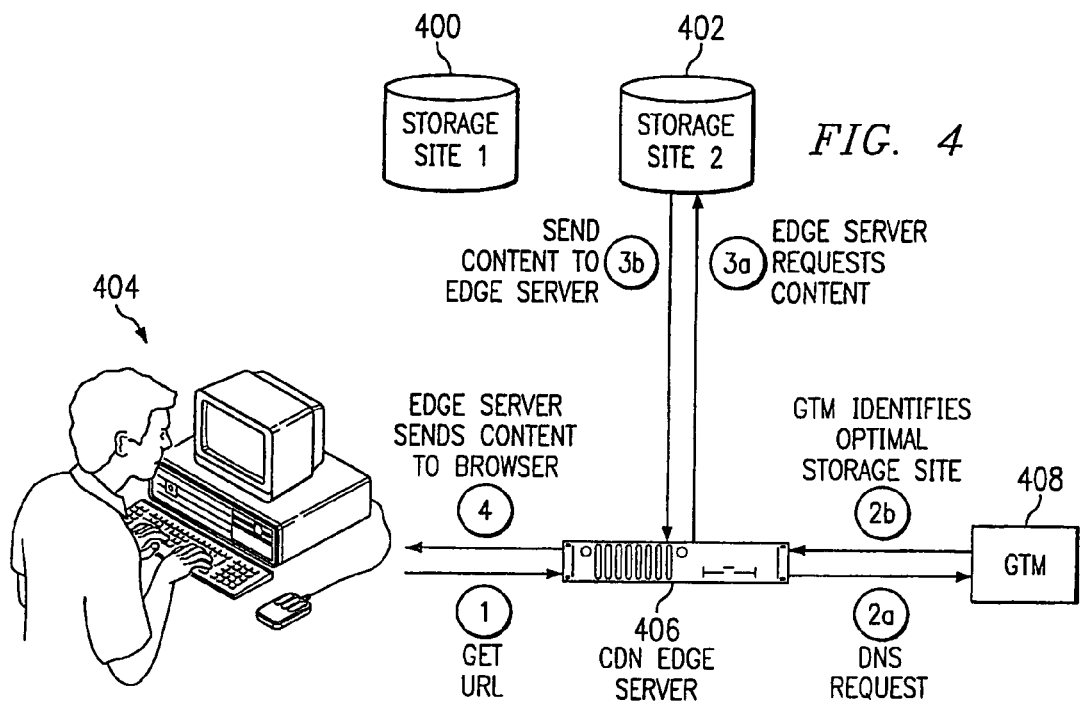
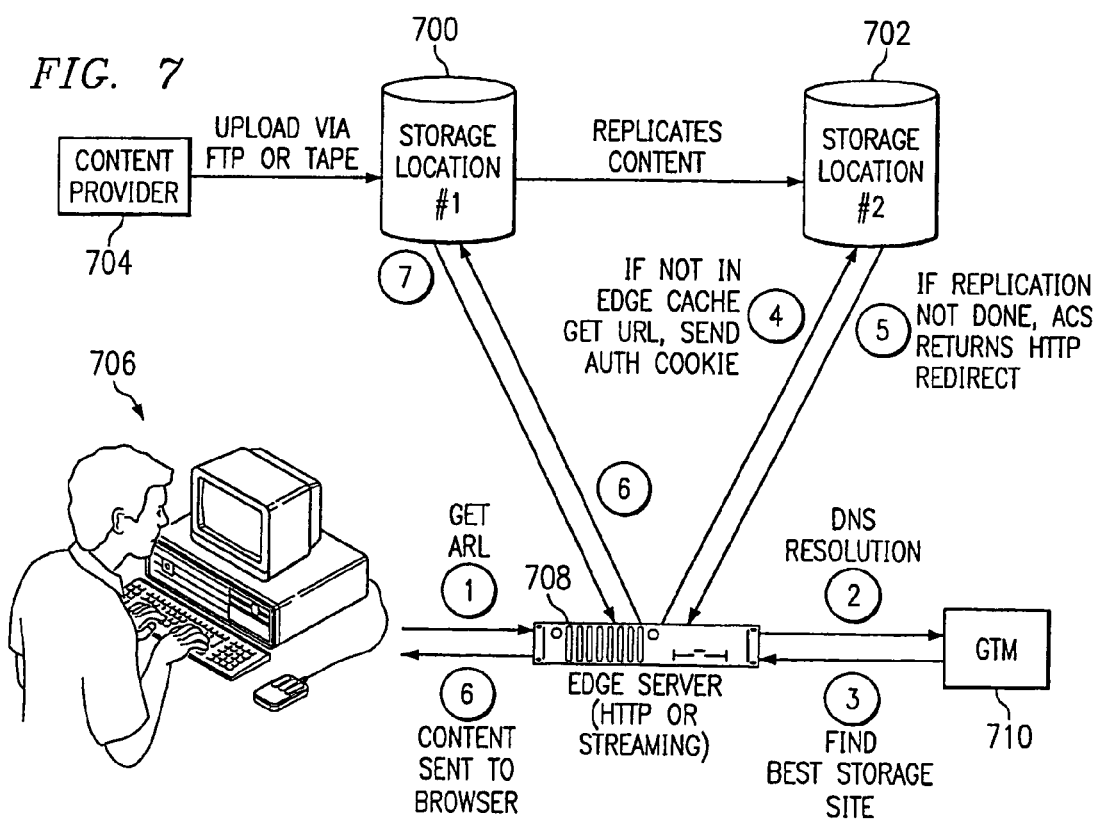

SCALABLE, HIGH PERFORMANCE AND HIGHLY AVAILABLE DISTRIBUTED STORAGE SYSTEM FOR INTERNET CONTENT

This application is a continuation of Ser. No. 10/113,183, filed Apr. 1, 2002 now U.S. Pat. No. 7,472,178, which application was based on and claimed priority to Ser. No. 60/280,917, filed Apr. 2, 2001.

RELATED APPLICATIONS

This application is related to the following commonly-owned applications: "Highly Available Distributed Storage System For Internet Content With Storage Site Redirection," Ser. No. 10/113,244, filed Apr. 1, 2002; and "Content Storage And Replication In A Managed Internet Content Storage Environment," Ser. No. 10/113,182, filed Apr. 1, 2002.

BACKGROUND OF THE INVENTION

1. Technical Field

The present invention relates generally to persistent, replicated, networked storage of Internet content, namely, graphics, images, streaming media files, software, and other digital objects.

2. Description of the Related Art

Content providers often have a need to store persistently the digital content they make available over the Internet. One business solution to this requirement is for the content provider to utilize the services of a so-called storage service provider (SSP). A typical SSP maintains a large amount of storage and provides a managed storage service that is built on top of a storage infrastructure. These entities typically operate single- location as opposed to replicated solutions. The SSP solution may not be fully satisfactory for several reasons. The SSP does not provide traditional hosting or content delivery, and it may only offer a limited or unacceptable service level. Some have scheduled downtimes that prohibit end-user access to content. Another approach to solving the need for persistent content storage is for the content provider to implement and manage its own in- house storage solution using storage products available from various vendors. Buying, deploying and managing an internal network storage solution requires costly capital expenditures. Also, management fees are typically many times the initial hardware cost, adding to the total cost of ownership. Further, internal management of network storage entails significant operational risk and typically is not a core competency of a given content provider.

There remains a need in the art to provide other means of network storage that overcomes these and other problems of the prior art.

BRIEF SUMMARY OF THE INVENTION

It is a primary object of the invention to provide persistent, replicated, networked storage of Internet content, e.g., graphics, images, HTML, streaming media files, software, and other digital objects.

It is another primary object of the invention to provide a set of content providers with a scalable, high performance and highly available content storage system.

It is still another object of the present invention to extend a content delivery network infrastructure to include a distributed storage system.

A more particular object of the invention is to provide a managed network storage service that uses replicated storage sites as the origin source for content delivery over a content delivery network (CDN).

The present invention may be implemented as a distributed storage system. Preferably, the system is implemented over two or more storage locations using three (3) distinct services: upload, replication and download. Content providers upload their content, preferably using conventional client software (e.g., a file transfer protocol (FTP) client, the Rsync file transfer utility, or the like) to a given one of the storage locations that is optimal for the upload. The system may include an API (application programming interface) to support the addition of other upload protocols. Once content is stored at a particular site, the content preferably is replicated to the other storage site(s). Thus, a particular content provider need only upload its content to one optimal site, and the system then replicates the uploaded content to the other storage site(s). When content is requested, e.g., by an edge server operating in a content delivery network (CDN), it is retrieved from a storage site that is optimal for the download.

Thus, according to the invention, a particular digital file may be uploaded to a given storage site yet downloaded from a different storage site depending on network conditions and server load at the respective upload and download times.

According to a more specific aspect of the invention, a method for content storage on behalf of participating content providers begins by having a given content provider identify content for storage. The content may be an image file, a streaming media file, a graphic file, a software download, or any other digital file identifiable by a locator such as a Uniform Resource Locator (URL). The content provider uploads the content to a given storage site selected from a set of storage sites. Preferably, the system identifies the given storage site by resolving a first type of URL via a traffic management system that takes into consideration network traffic conditions and server load. Following upload, the content is replicated from the given storage site to at least one other storage site in the set of storage sites. Later, a given entity may request that content. Upon request from the given entity, a given storage site from which the given entity may retrieve the content is then identified. Preferably, the given storage site for the download is identified by resolving a second type of URL via the traffic management system. The content is then downloaded from the identified given storage site to the given entity. In an illustrative embodiment, the given entity is an edge server of a content delivery network (CDN).

Once content is uploaded and replicated, the content is delivered quickly and efficiently, reaching an end user, for example, as follows. An end user requests content, e.g., from a Web site having content that is available for delivery over the content delivery network and that is replicated persistently in the content storage system. The CDN request routing directs the end user browser to an optimal CDN edge server. If the content is available from that server, it is returned to the requesting end user. If, however, the content is not available, the edge server quickly retrieves the content from the content storage system. In a preferred embodiment, the edge server is directed to an optimal set of storage servers in the content storage system based on real-time Internet traffic mapping. The edge server then retrieves the content from the storage site and delivers the content to the requesting end user. The content may also be cached at the edge server for use by other end users that are directed to the edge server.

Content downloads to a requesting end user do not require completion of the replication process. Rather, preferably content is available for download when the upload process completes and is not delayed until the replication completes. A given storage site thus has the capability of redirecting to another storage site a request for a given piece of content. This function is desirable because the traffic management system does not necessarily know which replicated storage site has the content. Thus, if an edge server is directed to a site that has yet to receive the replica, that site issues a redirect (e.g., an HTTP 302) to another storage site that may have the content. Infinite redirect sequences are avoided by limiting the number of redirects that a given edge server can undertake.

According to another feature of the invention, a given content provider can upload the same or different content to the two or more storage site(s) concurrently. Thus, the content provider may upload a first content file from a first location and, as a consequence, is directed to a first storage site by the traffic management system. The same provider can still upload a second content file from a second location to a second storage site because the traffic management system may determine that the second storage site is preferable. Likewise, two or more content providers can upload different content to two or more storage sites concurrently under the direction of the traffic management system. This provides a high degree of fault tolerance in the event a particular storage site is unavailable and/or allows for greater throughput in the upload process.

The storage sites are typically located in different locations in different networks that are connectable over the publicly-routable Internet. As a consequence, connectivity between or among the storage sites cannot be guaranteed. Thus, to ensure fault tolerance, the replication service of the present invention operates across storages sites that function asynchronously. In particular, every storage site operates asynchronously and autonomously. When connectivity between (or among) sites permits, the contents of each of the "local" filesystems are reconciled. Stated another way, content providers can upload their content to particular storage sites even if those sites cannot talk to each other, and the replication model tolerates (and, indeed, expects) that the local filesystems remain unsynchronized until connectivity between sites is established or re-established, as the case may be.

A given storage site preferably comprises a set of client servers that provide the upload, replication and download services, a network filesystem on which the content is stored, and a set of file servers (such as NFS) that export the network filesystem to the client servers. The file servers connect to the client servers through a switch, and preferably the file servers are not accessible directly from the Internet. Some of the client servers execute upload (e.g., FTP) processes, and some of the client servers execute download (e.g., HTTP) processes. Each client server preferably also executes an instance of a so-called "replication engine" that manages the storage of content uploaded to the site. The replication engines on the client servers within the storage site preferably execute a leader election protocol that ensures that, at most, one of the replication engines functions as an overall controller for the various replication operations. In operation, the upload processes executing on the client servers connect to the leader. Each storage site also includes a set of logs, including a first (local) log, and a second (remote) log. When a content provider desires to upload content, it connects to an upload process and uploads the content to the upload process. The upload process notifies the replication leader, which instructs the upload process where in the local filesystem to store the content. Once replication in the local filesystem is complete, the replication leader records the event (the upload) in its local log. The replication leader then notifies the replication leader in each of the other storage site(s) of its local log entry. At the replica site, however, a corresponding entry is made in that site's remote log. Thus, each upload to a given storage site results in an entry in the local log of the given storage site and in a corresponding entry in the remote log of each of the replica sites. The replication leader at the replica site then undertakes to effect the required action, e.g., retrieving the content from the upload site, deleting the file from its local filesystem, or the like.

The leader election protocol (which ensures that, at most, one replication engine leader per storage site is executing) provides for fault-tolerance in the event of any failure of the machines running the replication engines. Leader election also ensures that only one replication process can alter the local state of the filesystem irrespective of events occurring at the other storage sites.

Because perfect synchronization is not possible over the Internet, each site thus maintains a persistent log of all of the operations it has performed and which it has been requested to perform. Each site preferably uses its logs to ensure that it replicates the content at its peers. In addition, preferably the logs are designed so that they can replayed at each site to reconstruct an identical view of the content. The goal is to ensure that all operations are executed in a consistent order across all replica sites. Preferably, timestamps are used to impose overall order on all file operations. In an illustrative embodiment, all log entries are given a timestamp that is used to ensure that log entries are replayed and acted on in the original order in which they occurred across all sites.

The foregoing has outlined some of the more pertinent objects and features of the present invention. These objects should be construed to be merely illustrative of some of the more prominent features and applications of the invention.

BRIEF DESCRIPTION OF THE DRAWINGS

For a more complete understanding of the present invention and the advantages thereof, reference should be made to the following Detailed Description taken in connection with the accompanying drawings, in which:

FIG. 4 is a detailed illustration of an end user client browser interaction with the content storage system of the present invention;

FIG. 7 is a simplified diagram illustrating how the content storage system uses storage site redirection if given content is not available at a particular storage site.

DETAILED DESCRIPTION OF THE PREFERRED EMBODIMENT

Figure 1:
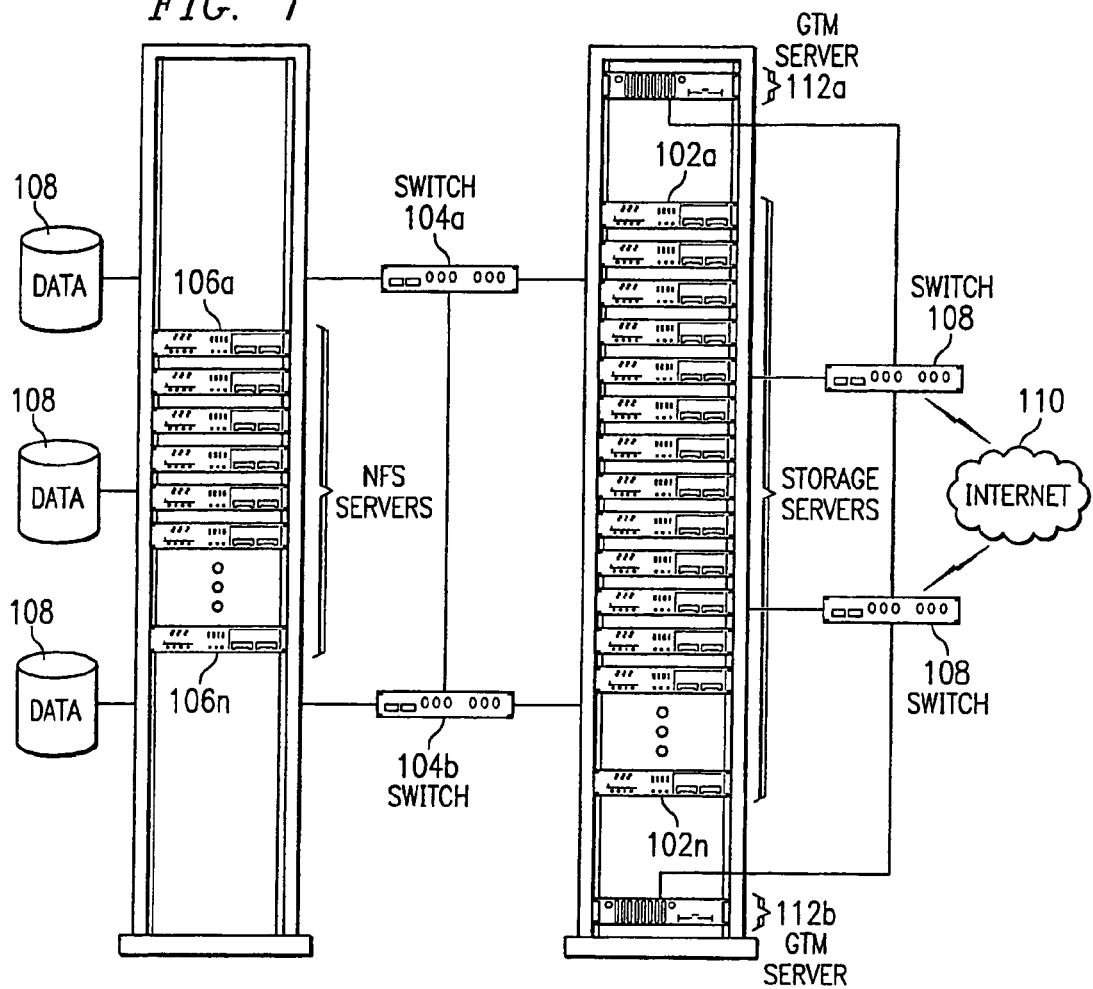
FIG. 1 is an illustrative storage site according to the present invention.

In a preferred embodiment now described, the content storage solution is a managed service provided by a service provider, such as a content delivery network (CDN) service provider (CDNSP). Implementation of the inventive storage architecture as a managed service is not a requirement, of course.

A CDN is a network of geographically distributed content delivery nodes that are arranged for efficient delivery of digital content (e.g., HTTP ("Web") content, streaming media files, software applications, and the like) on behalf of third party content providers. A request from a requesting end user for given content is directed to a "best" replica, where "best" usually means that the item is served to the client quickly compared to the time it would take to fetch it from the content provider origin server. Typically, a CDN is implemented as a combination of a content delivery infrastructure, a request-routing mechanism, and a distribution infrastructure. The content delivery infrastructure usually comprises a set of "surrogate" origin servers that are located at strategic locations (e.g., Internet Points of Presence, network access points, and the like) for delivering copies of content to requesting end users. The request-routing mechanism allocates servers in the content delivery infrastructure to requesting clients in a way that, for web content delivery, minimizes a given client's response time and, for streaming media delivery, provides for the highest quality. The distribution infrastructure consists of on-demand or push-based mechanisms that move content from the origin server to the surrogates. An effective CDN serves frequently-accessed content from a surrogate that is optimal for a given requesting client. In a typical CDN, a single service provider operates the request-routing mechanism, the surrogates, and the content distributors. In addition, that service provider establishes business relationships with content publishers and acts on behalf of their origin server sites to provide a distributed delivery system. A well-known commercial CDN that provides web content and streaming media delivery is provided by Akamai Technologies, Inc. of Cambridge, Mass.

The present invention provides a content storage system for providing a scalable; high performance and highly available architecture for persistent, replicated networked storage of Internet content for the benefit of participating content providers. In one embodiment, the service is built upon an infrastructure of geographically-diverse storage sites run, for example, by a CDNSP, by third parties such as SSPs, or by the CDNSP and one or more storage service provider (SPP) partners. Each storage site preferably contains multiple terabytes (TB) of storage capacity, together with front-end servers that provide access for content upload and deletion, as well as access for content retrieved by given entities (e.g., CDN edge servers), servers that copy files to multiple storage locations, servers that export the network filesystem to the front-end servers, and dual Internet Service Provider (ISP) connectivity, protecting the storage site against ISP failures.

FIG. 1 illustrates a representative layout of a representative storage site. A storage site is a collection of one or more storage "regions," typically in one physical location. As will be seen, content is replicated across storage sites, and it is assumed that there is no significant benefit to replicating within a given storage site (although this is not a limitation of the invention). As illustrated, a storage region 100 is a collection of client servers 102a-n that share a (preferably redundant) back-end switch 104a, 104b. As illustrated, the storage region also includes a set of file servers 106a-n, e.g., NFS servers, which, together with the network filesystem 108, provide raw storage to a set of content upload, download and replication services provided by the client servers 102. The NFS servers export the network filesystem to the client servers. Preferably, a set of client servers is operated in each region for fault tolerance. At least some of the client servers execute upload (e.g., FTP) processes, and at least some of the client servers execute download (e.g., HTTP) processes. Preferably, each of the client servers executes a replication engine, which provides overall content management for the storage site as will be seen. Content upload is a service that allows a content provider to upload content to the storage site. Content replication is a service that ensures that content uploaded to a given storage site is replicated to a set of other storage sites (each a "replica" or "replica site") to increase content availability and improve performance. Preferably, content is replicated across multiple storage sites according to per-customer configuration information. Content download is a service that allows content to be accessed by an entity, e.g., via a CDNSP edge server, that makes a given request. Thus, in an illustrative embodiment, a storage site preferably consists of a network filesystem, and a set of NFS servers 106 that export the network filesystem to a set of client servers 102.

The file servers 106 may be CDN-owned and operated or outsourced. One preferred deployment uses outsourced storage, such as storage available from a storage service provider (SSP). The client servers 102 may be stock CDN servers and preferably are organized as a set or grouping. Some CDN service providers refer to a set of CDN edge servers as a region. In this example, the servers in the region share a back-end switch 104 and are connected to the Internet 110 via one or more front-end switches 108. Thus, a storage region is a set of machines that share at least one back-end switch. Preferably, the NFS servers 106 are attached to the back-end switches 104 as illustrated in FIG. 1. A representative configuration is as follows. The back-end switches are Foundry FastIron IIs with dual PSUs and fans. The EMC Celerra NFS servers consist of multiple physical NFS devices each with their own Gigibit Ethernet connection. Of course, the above configuration is merely representative as equipment from other vendor sources may be used. These individual NFS devices are configured as two groups of seven, with 6+1 redundancy within each group. Thus, the failure of a single NFS server can be tolerated within each group of six (6) without any service interruption. The entire device can be viewed as a collection of separate servers apart from the 6+1 redundancy described above. Of course, other configurations may be used. Each switch preferably has sufficient ports to run the entire storage region on its own. As is illustrated, preferably there is no front-end connection for the NFS servers so that the only way to access them is via the client servers. In a representative embodiment, each client server in the managed storage site operates commodity hardware, an operating system (such as Linux, Windows 2000, or the like), and one or more computer programs that provide the upload, replication and/or download services.

The managed storage service comprises two or more storage sites, each of which may comprise the implementation of FIG. 1. As also seen in FIG. 1, the storage site may also host one or more servers 112a, 112b of a global traffic management system. GTM products and services are known in the art and are useful to determine which of a set of mirrored machines should be used for obtaining given content. The present invention may use a given GTM product or managed service to determine which storage site receives the content when it is initially uploaded to the storage system, and which storage site should be used as the target of a request for the content by a given entity such as a CDN edge server.

Figure 2:
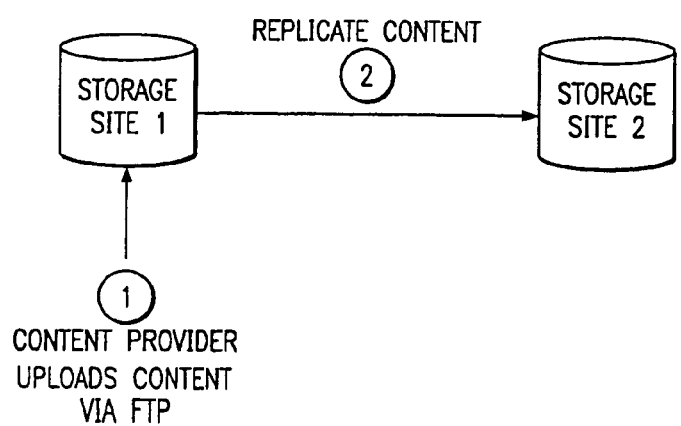
FIG. 2 is a simplified illustration of how a participating content provider uploads content to an optimal storage site and the replication of that content to a mirror site according to the present invention.

As illustrated in FIG. 2, the first step in using the distributed storage system of the present invention is to have a participating content provider upload content to a storage site. This is represented by arrow (1). Preferably, the upload is accomplished via a client program executing a given file transfer protocol. Thus, the upload may be accomplished with any industry-standard FTP client, Rsync (an incremental file transfer utility available under the General Public License (GPL)), or the like. The above techniques are merely representative, as any convenient delivery of the file can be used, including, without limitation, even physical delivery of digital media (CD-R, CD-RW, tape, diskette, or the like) on which the content has been previously recorded. Yet another alternative is to have a given one of the storage site(s) dynamically pull the content from the content provider origin site if the content were not otherwise already available to the distributed storage system.

According to the invention, the participating content provider need not identify a particular storage site (Storage Site #1 in FIG. 2) or otherwise direct the content to a particular location. Rather, in the preferred embodiment, the content provider enters a suitable arrangement with the service provider and merely points the content to the distributed storage system. In particular, preferably each content provider is given FTP (Rsync or other appropriate) access to the service via a unique domain name of the form:

customername.upload.cdnsp.com, where cdnsp is the name of the service provider and the customername.upload portion of the domain is used to cue a Domain Name Service (DNS)-based request routing mechanism to identify the optimal storage site from a set of mirrored sites. The set of mirrored storage sites is illustrated in FIG. 2 as Storage Site #1 and Storage Site #2. Thus, for example, in one embodiment, the domain name is resolved, preferably via a traffic management product, system or managed service, to identify a live client (e.g., FTP) server in Storage Site #1 that is optimally located (e.g., in terms of load, network traffic conditions and/or latency) to receive the content upload from the content provider. As will be described in more detail below, the content system FTP server presents the FTP client with one or more top-level directories into which to deposit content. Each directory preferably is customer-specific, and a customer may have one or more directories depending on the amount and type of content to be stored. After the content is uploaded to the storage site that is optimal for the particular content provider and content upload, the managed storage service replicates the content to other storage site(s). Thus, the arrow (2) in FIG. 2 illustrates the replication step wherein the content originally uploaded to Storage Site #1 is then replicated to Storage Site #2. At this point, the content becomes available for download from two or more storage site(s). Stated another way, although the content is ultimately stored on multiple storage site(s), the customer preferably only needs to upload content to a single site. After an FTP file upload (or delete) operation, the service's replication mechanism/service automatically copies the file (or propagates the delete) to the other storage site(s).

Preferably, content is available for download when the upload (whether by FTP, Rsync, or otherwise) completes and is not delayed until the replication completes. In particular, the traffic management system does not necessarily know which of the storage site(s) has the content; rather, as will be described below, preferably the traffic management system simply maps the requesting edge server to an optimal site based on constant monitoring and analysis of network performance, congestion, and server load. If the traffic management system maps the edge server to a site that does not have the content, then that site preferably issues a redirect (e.g., an HTTP 302) to another storage site that may have the content. If a request is made for a file that has never been found, then an infinite redirect sequence (site A redirects to site B, which redirects to site C, which redirects to site A, and so forth) is avoided by having the edge server count the number of redirects it encounters. When a given threshold is met, the edge server serves an error message (e.g., an HTTP 404) or takes some other action. In an alternative embodiment, once the redirect threshold is met, the missing file may be dynamically downloaded from the origin server.

Although not shown in FIG. 2, after content is populated across the distributed storage in this manner (or even before replication), given entities (e.g., machines, systems, applications, processes or users) can download the content from a selected one of the storage sites. In the preferred embodiment wherein the storage system is implemented in the context of a content delivery network, the given entities are CDN edge servers that, in the event of a cache miss, retrieve (download) the stored content from a selected one of the storage site(s). This may be achieved as follows. Preferably, content hosted on the storage sites is available through URLs. These "download" URLs, in contrast to the upload URLs used by the content providers, may have the following format:

customer_name.download.cdnsp.com/customer_dir/path/filename, where "customer_name.download.cdnsp.com" is a domain resolvable (preferably through a traffic management product, system or managed service) to a live server in a storage site that is optimally located (in terms of load, network traffic conditions and/or latency) to deliver the content, "customer_dir" identifies the customer-specific top-level directory that contains the requested content, and path/filename represents the directory and file (e.g., ads/car.asf) created by the customer via FTP, Rsync or other upload means. For customers with relatively small amounts of content (e.g., less than 100 GB), customer_dir is simply a customer's CP (i.e., content provider) code; for customers with large amounts of content, customer_dir is of the form cpcode/a, cpcode/b, cpcode/c, and so on. An example storage URL is: yourcompany.download.cdnsp.com/555/b/ads/car.asf.

A "download" URL is sometimes referred to as a storage URL. It is created (e.g., by the content provider, the CDNSP, or a third party) either manually or by automated means when the content provider publishes the content. Thus, according to the invention, a content provider preferably publishes the content to the storage system initially (i.e., during the upload process) using a first type of URL (an upload URL) that includes a domain name resolvable to an optimal site to receive the content provider upload, as well as a second type of URL (a download or "storage" URL) that includes a domain name resolvable to an optimal storage site for edge server download. The storage sites need not be the same, of course.

Thus, according to the present invention, if the managed storage service is implemented in a content delivery network (CDN), the service customers may have the option of converting an object URL into a CDN-specific resource locator so that requests for the given object go to CDN edge servers. The resulting modified URL typically includes CDN-specific information prepended to the original URL, which may be maintained for content retrieval on a cache miss. Customers who elect to use modified URLs can use the storage URL as the original URL, so that CDN edge servers are directed to go to the storage service for the content on a cache miss. The following is an example of how a URL (modified to point to the CDN) might look for use by the managed storage service of the invention:

a9.g.cdnsp.net/cust.download.cdnsp.com/dirA/foo.asf, where a9.g.cdnsp.net is the URL prepend that directs the CDN request routing mechanism to a preferred edge server, and cust.download.cdnsp.com/dirA/foo.asf is the storage URL as has been described above. Alternatively, use of the service can be transparent if the customer simply directs queries to an existing customer domain or subdomain to a domain (such as the a9.g.cdnsp.net domain) through modifications (e.g., CNAMing, delegation, or the like) of the customer's DNS name server records. Preferably, this is accomplished by defining metadata that directs the CDN edge servers to the storage site(s) for content. Metadata can be delivered to the edge servers in any convenient manner.

Figure 3:
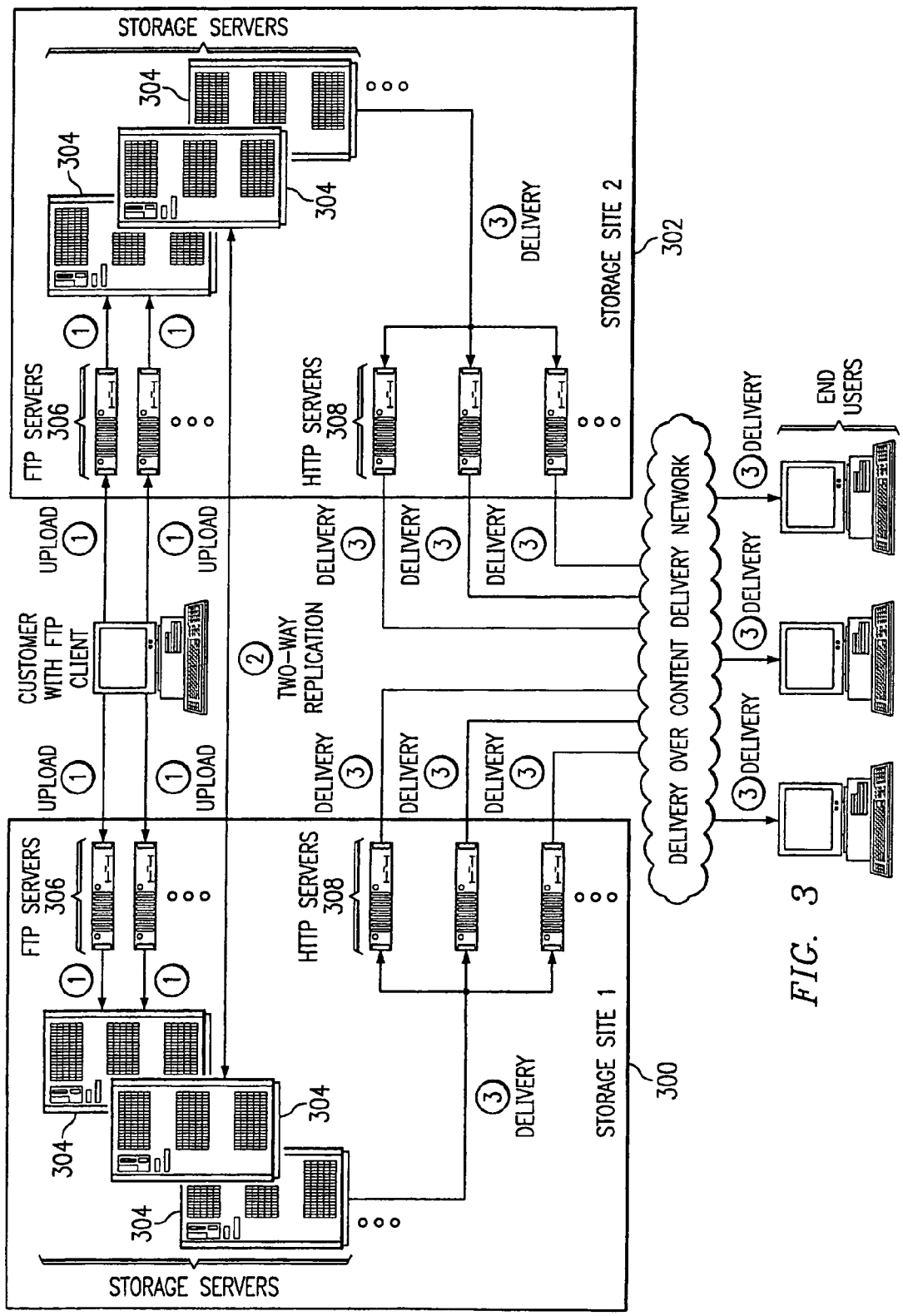
FIG. 3 is a more detailed illustration of the content upload, replication, and content download mechanisms of the present invention.

FIG. 3 illustrates the content storage system in detail, showing how the upload, replication and download services provide a full end-to-end storage environment. In this example, there are two geographically-dispersed storage sites 300 and 302. Each storage site includes a set of storage servers 304, a set of FTP (upload) servers 306, and, in this example, a set of HTTP (download) servers 308. A participating content provider machine 308 running an FTP client establishes a FTP (or Rsync or some other equivalent file transfer) connection to one of the storage sites 300, 302, preferably under the control of a global traffic manager product, system or managed service as discussed above. Of course, the storage sites can be selected based on some other metric or no metric (e.g., by round robin). Once content is uploaded and stored on the storage servers 304, the replication mechanism provides two-way replication such the content becomes available from both sites even though it was only uploaded to one of them. (As noted above, content stored on one site may be available for download even prior to completion of the replication process). Thereafter, end users (e.g., client machines running HTTP compatible browser software with appropriate media players for streaming content) request that content, which is then delivered on an as-needed basis from either the CDN edge servers or the HTTP download servers 308 via the content delivery network (CDN).

Content delivery to an end user is illustrated in more detail in FIG. 4. In this example, it is assumed that the content has already been uploaded to a given storage site (e.g., Storage Site 400) and already replicated to the mirror site (e.g., Storage Site 402). It is also assumed that the URL for the object being requested by the end user's browser has been modified to point to the CDN and is hosted in the content storage system. The CDN's request routing mechanism directs the end user's browser 404 to the optimal CDN edge server 406. In the event of a cache hit, the edge server simply returns the content to the browser and steps (2) and (3) are omitted. This operation is described, for example, in U.S. Pat. No. 6,108, 703. In the event of a cache miss, however, the edge server 406 must retrieve the content from the storage system. At step (2a), the edge server 406 makes a DNS query to resolve the storage URL to the global traffic management (GTM) system 408 and, in response, is provided at step (2b) with the IP address of one of the storage sites. As described above, the GTM resolves a storage URL domain, such as yourcompany-.download.cdnsp.com, to the optimal storage site based on, for example, real-time Internet traffic and server load mapping. At step (3a), the edge server makes a request to the storage site and, in response, retrieves at step (3b) the content from the optimal storage site. At step (4), the edge server delivers the content to the browser and stores it in cache (if possible) for future requests. This completes the processing.

Preferably, storage content is protected for upload and download. The ability to upload content to the service preferably is limited to only those people with knowledge of the customer's password-protected account information. The ability to download content from a storage site preferably is limited to CDN edge servers. In other words, if an end user attempts to download content via a storage URL, access preferably is denied.

One of ordinary skill will appreciate that the distributed storage system of the present invention enables a given content provider to upload the same or different content to the two or more storage site(s) concurrently. Thus, the content provider may upload a first content file from a first location and, as a consequence, is directed to a first storage site by the traffic management system. The same provider can still upload a second content file from a second location to a second storage site because the traffic management system may determine that the second storage site is preferable. Likewise, two or more content providers can upload different content to two or more storage sites concurrently under the direction of the traffic management system. This flexibility provides a high degree of fault tolerance in the event a particular storage site is unavailable and/or allows for greater throughput in the upload process. Multiple content providers thus can take advantage of the storage infrastructure.

The storage sites are typically located in different locations in different networks that are connectable over the publicly-routable Internet. As a consequence, connectivity between or among the storage sites cannot be guaranteed. To ensure fault tolerance, however, the replication service of the present invention operates across storages sites that function in an asynchronous, autonomous manner. When connectivity between (or among) sites permits, the contents of each of the "local" filesystems are reconciled. Stated another way, content providers can upload their content to particular storage sites even if those sites cannot talk to each other, and the replication model tolerates (and, indeed, expects) that the local filesystems remain out of synchronization until connectivity between sites is established or re-established, as the case may be. How the replication service reconciles the local filesystems is described in detail below.

It is not necessary that the content storage system utilize any particular type of traffic management product or service to direct the FTP client software (initiating an upload) to an optimal content storage site, and/or to direct an edge server (initiating a download) to an optimal content storage site. An illustrative GTM system, however, is known commercially as FirstPoint$^{SM}$ and is available from Akamai Technologies of Cambridge, Mass. This technique is described in commonly-owned, U.S. Pat. No. 7,111,061, titled Global Load Balancing Across Mirrored Data Centers, which is incorporated herein by reference. Other commercial available products include Cisco Global Director, global load balancers from F5, and the like. Any product/system/managed service that has the ability to direct a client request to one of a set of mirrored sites based on network traffic conditions, server load, and the like, may be used in the present invention.

Figure 5:
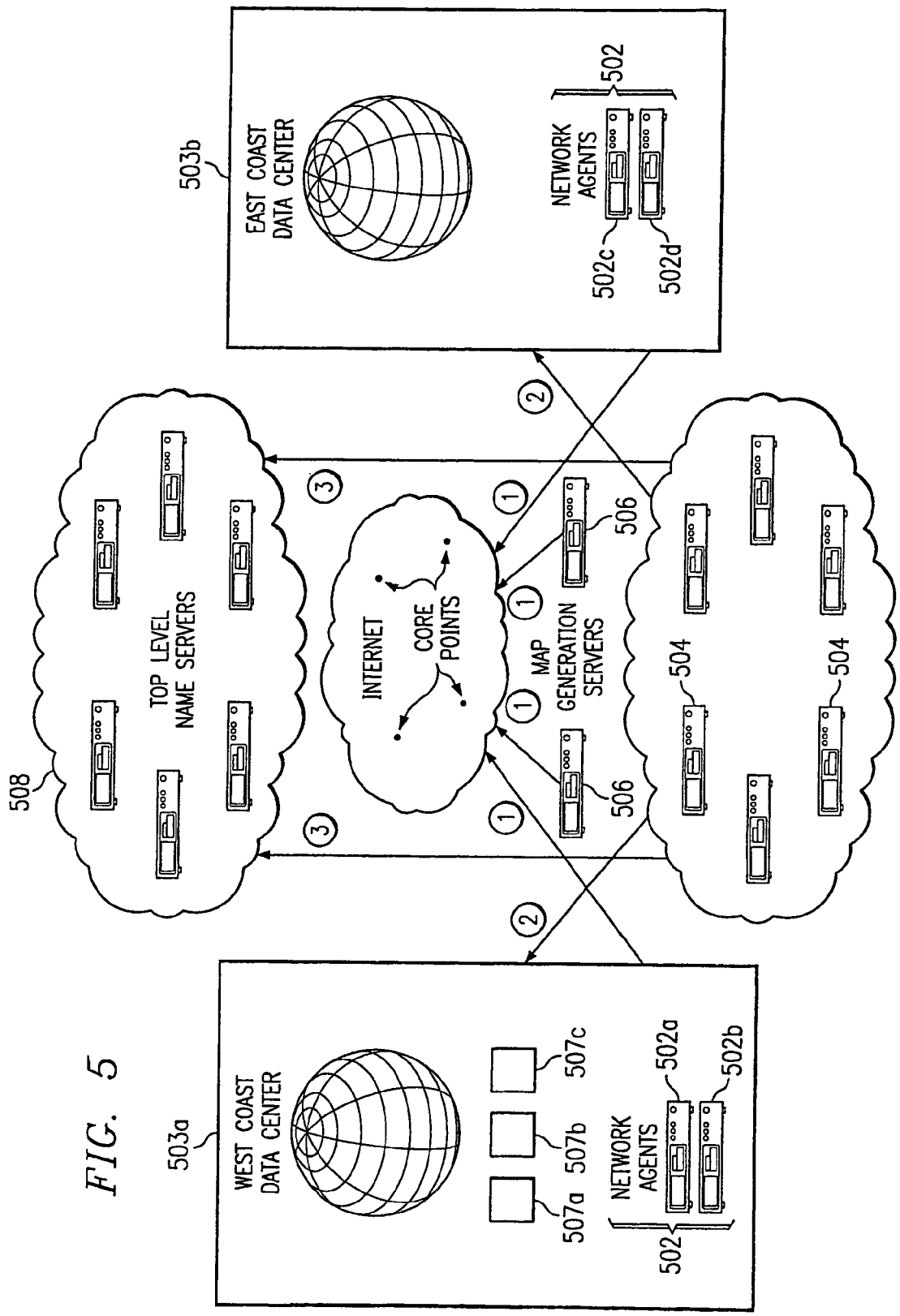
FIG. 5 is representative global traffic management system for use in the present invention to select the optimal storage site for content uploads and downloads.

FIG. 5 illustrates the representative GTM service of U.S. Pat. No. 7,111,061, which is one preferred technique. For illustrative purposes only, the GTM service 500 comprises a number of components: a set of network agents 502, a set of web server agents 504, a set of map generation servers 506, and a set of name servers 508. Each such component typically is a server, such as a Pentium-based box running the Linux operating system and having application software for carrying out the functions described below, or one or more processes executing on such a machine. Data is collected by the network agents and the web server agents and delivered to the map generation servers. The map generation servers analyze the data, and at least one map server produces a map that assigns name server IP address/blocks to regions. At least one map is then uploaded to the name servers. In the context of the inventive storage system, when a CDN edge server requests access to a mirrored storage site domain being managed by the service, one of the name servers hands back an IP delegation that represents a "best" data center to which the edge server should connect.

In this example, a storage site has network agents located in or near their network segment within each respective data center that hosts the mirrored storage site. Thus, for example, a pair of network agents 502a and 502b are dedicated to the storage site in data center 503a, and a pair of network agents 502c and 502d are dedicated to the storage site in data center 503b, although this is not required. As illustrated in FIG. 1, these network agents preferably share the same network connection as the storage site's web servers. A data center typically is located at a telecommunications facility (e.g., Exodus, Frontier Global, UUNet, and the like) that leases space and sells connectivity to the Internet. A network agent has two (2) primary functions: running "core point" discovery (CPD) to determine a set of "core" points, and monitoring network performance to each core point. As described in U.S. Pat. No. 7,111,061, the GTM system continuously pre-computes optimal maps, preferably for the user base of the entire Internet. It is able to do this effectively because the system reduces the scale of the problem by aggregating parts of the Internet and representing them with "core" points. A core point typically is representative of a set of local name servers (or other hosts) that, from the perspective of a given network location (e.g., a data center), share the point. Typically, a core point is a router on the Internet, although this is not a requirement. The information collected from the core point discovery process is fed to the map generation servers on a relatively frequent basis, e.g., once every thirty (30) seconds, to identify down routes, congestion, route changes, and other network traffic conditions that may impair or effect connectivity to a data center at which a particular mirrored site is hosted.

A core (or "common") point is discovered as follows. An incremental trace route is executed from each of the set of mirrored data centers to a local name server that may be used by client to resolve a request for a replica stored at the data centers. An intersection of the trace routes at a common routing point is then identified. Thus, for example, the common routing point may be the first common point for the trace routes when viewed from the perspective of the data centers (or the last common point for the trace routes when viewed from the perspective of the local name server). The common routing point is then identified as the core point for the local name server. A core point is identified for other local name servers (or other hosts) in the same manner. Thus, a given set of mirrored data centers may have associated therewith a set of core points that are then useful in estimating the relative connectivity to the set of data centers. The network agent identifies other core points for other local name servers (or other hosts) in the same manner. Thus, a given set of mirrored data centers may have associated therewith a set having one or more core points that are then useful in estimating the relative connectivity to the set of data centers, as is described below. If network paths on the Internet are changing frequently, a network agent preferably runs core point discovery with some frequency. A network agent also performs the function of periodically checking the core points assigned to one or more local name servers that already have been mapped.

In particular, as further described in U.S. Pat. No. 7,111,061, network agents preferably make measurements to core points using Internet Control Messaging Protocol (ICMP) (or so-called "ping" packets) to evaluate such information as round trip times (RTTs), packet loss, and number of router hops. Thus, a given network agent periodically "pings" a core point (e.g., every 30 seconds) and collects the associated latency and packet loss. Using such data, the network agent calculates an average latency. The network agent calculates average latency using an exponentially time-weighted average of all previous measurements and the new measurement. The network agent uses a similar function to calculate average packet loss. Using the results, the network agent generates a "score" for each path between one of the data centers and the core point. The score is generated, for example, by modifying an average latency with a given penalty factor that weights the average latency in a unique way to provide a download prediction. Whichever data center has the best score (representing the best-performing network connectivity for that time slice) is then associated with the core point.

Referring back to FIG. 5, the web server agents 504 do test downloads to either all the web server IP addresses or to the local load balancing devices to test for availability or "aliveness" of the mirrored storage sites (i.e., per-datacenter mirror or web server). Typically, a web server agent tests an object, e.g., a twenty (20) byte file available on the web server via an HTTP GET request, and checks for errors and download times. In a representative embodiment, the measurements are taken periodically, e.g., every ten (10) seconds. An IP address is declared "dead" if more than a given percentage of the web server agents are unable to download the test object within the timeout threshold. This allows the setting of a threshold on response times so that the system can direct traffic away from data centers where performance suffers. The web server agents are preferably dispersed in co-location facilities, which are dispersed geographically and on a network basis.

The map generation servers 506 receive data from the network agents and the web server agents and use this data to generate maps, which describe the mirrored storage site that is optimal for each IP address block. In one embodiment, a map is achieved by evaluating web server agent data, a time-weighted average of latency and packet loss, and BGP and geo information. Preferably, maps are generated periodically, e.g., every 3-5 minutes. Although not a limitation, preferably the map generation servers associate IP blocks with Internet "regions" such that a given map associates an IP block with a region number. Another data file is then used to associate region number to physical IP address. In a representative embodiment, maps (which associate IP block to region #) are generated every few minutes and then uploaded to the name servers. The name servers 508 hand out to the requesting edge server the IP address(es) of the optimal data center (i.e., storage site).

Figure 6:
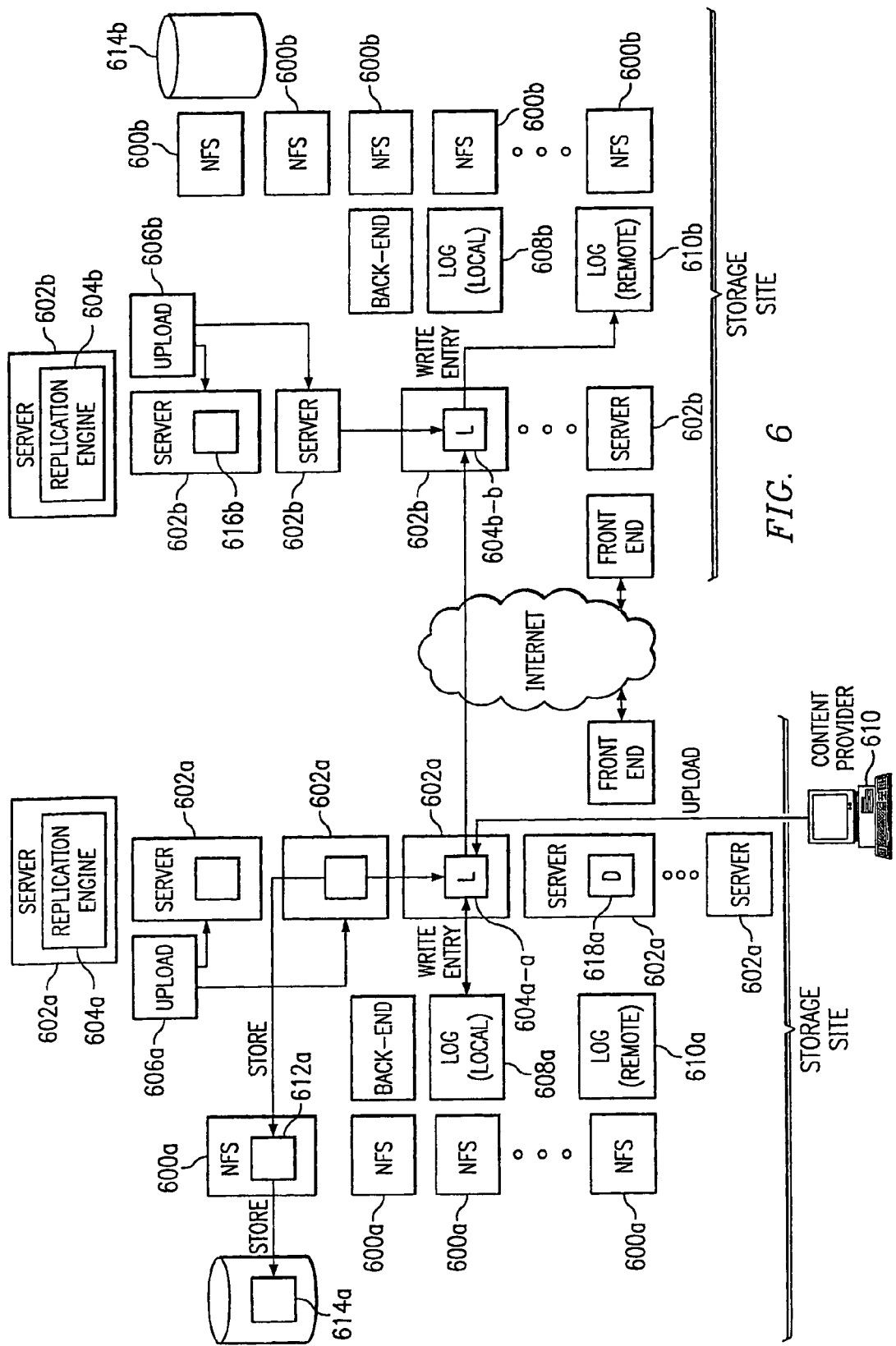
FIG. 6 is a simplified diagram illustrating how the replication engine leader manages the content replication service across a set of managed storage sites according to the present invention.

As described above, a given storage site preferably comprises a set of client servers that provide the upload, replication and download services, a network filesystem on which the content is stored, and a set of file servers (such as NFS) that export the network filesystem to the client servers. At least some of the client servers execute upload (e.g., FTP) processes, and at least some of the client servers execute download (e.g., HTTP) processes. In one embodiment, each client server runs FTP, HTTP and Rsync processes. Each client server preferably also executes an instance of a so-called "replication engine" that manages the storage of content uploaded to the site. The replication engines on the client servers within a given storage site preferably execute a leader election protocol that ensures that, at most, one of the replication engines functions as an overall controller for the various replication operations. FIG. 6 illustrates how the elected replication engine manages the content upload and replication services.

In this example, storage site 600a has a respective set of client servers 602a, each of which executes a replication engine 604a as illustrated. Some of the client servers 602a also execute an upload process 606a. Storage site 600a also includes data structures identified as a local log 608a, and a remote log 610a. Storage site 600b has a similar configuration, with corresponding elements designated by the reference letter "b." In operation, it is assumed that a replication leader (such as 604a-a, and 604b-b) has been selected in each storage site (by the leader election protocol, described below) and the upload processes 606 executing on their respective client servers 602 are connected via a network protocol to the leader. It is assumed that content provider 610 has been directed to storage site 600a by a traffic management system. The content provider 610 connects to a given upload process 606a and uploads (e.g., via FTP, Rsync, or the like) the content to that process. The upload process 606a notifies the replication leader 604a-a, which instructs the upload process 606a to place the content in a temporary location 612a in the filesystem. The upload process 606a notifies the replication leader 604a-a when the content is written to the temporary location. The replication leader 604a-a then writes an entry into the local log 608a, identifies a permanent location 614a for the content, places the content in that permanent location, and notifies the upload process 606a that the local storage is complete. Once the file has been placed in the network filesystem, it is available for download should a given entity (e.g., a CDN edge server) need the file. At this point, and assuming connectivity exists, the replication leader 604a-a notifies the replication leader 604b-b in the storage site 600b that the upload event has taken place. The replication leader 604b-b in the storage site 600b receives this notification and writes a corresponding entry in its remote log 610b. The replication leader 604b-b then instructs a fetch process 616b executing on a client server 602b to connect to a given download process 618a executing on a client server 602a to pull the content over to the replica site.

Thus, once upload in the local filesystem is complete, the replication leader records the event (the upload) in its local log. The replication leader then notifies the replication leader in each of the other storage site(s) of its local log entry. At the replica site, however, a corresponding entry is made in that site's remote log. Thus, each upload to a given storage site results in an entry in the local log of the given storage site and in a corresponding entry in the remote log of each of the replica sites. The replication leader at the replica site then undertakes to effect the required action, e.g., pulling the content from the upload site, deleting the file from its local filesystem, or the like.

As noted above, another feature of the present invention is the ability of a storage site to redirect the requesting entity (e.g., the CDN content server) to another storage site if the desired content is not present in the storage site to which the requesting entity is initially mapped. FIG. 7 illustrates the redirection process that takes place when the requesting entity has been mapped to a storage site but where the replication to that site has not been completed (i.e., the content is not available). As described above, in this embodiment there are two storage sites 700 and 702, and content provider 704 has uploaded content to site 700 as indicated in step (A). At step (B), storage site initiates replicates the content to storage site 702. Now, assume that an end user 706 has requested the content and been directed to the CDN edge server 708. This is illustrated as step (1). Assuming a cache miss, at step (2) the CDN edge server 708 asks the traffic management system 710 for a resolution of a download-style domain. Traffic management system 710 returns an IP address of the optimal storage site (in this case, site 702) at step (3). Edge server 708 then issues a request to site 702 in step (4), sending an authentication cookie. Because the replication process (step (B)) is not completed, storage site returns an HTTP redirect at step (5). The edge server 708 is then redirected to storage site 700 as indicated at step (6) even though that site was not the optimal one initially. At step (7), the content is returned to the edge server 708 to complete the process. As noted above, additional redirects may occur as necessary to retrieve the content and/or until a given number of redirects have occurred.

The following describes a detailed implementation of the present invention, beginning with Content Upload and Download functions.

1.1 Content Directories:

Preferably, configuration of the storage system is on a per-directory basis. In particular, a directory represents the unit of replication and authentication. Directories and content provider (cp)-codes are distinct and in particular a single cp-code may have multiple directories associated with it. All such directories preferably are considered as one for the purposes of billing and monitoring. Replication directories preferably are restricted to be composed of an arbitrary number of pathnames, provided that the number of such pathnames is the same across all directories associated with the same cp-code pathnames, e.g., /a and /b, or /a/b and /c/d, or /a/b/c and /d/e/f. . In addition, the /a component preferably is a cp-code. The cp-code preferably is specified explicitly in the configuration file to avoid having to build in any assumptions about where it occurs in the directory name and having to re-parse the directory to determine the cp-code. Thus, the /a component above need not be a cp-code, but conventionally it is so configured.

1.2 Content Upload:

As described above, content upload is provided via FTP, Rsync, or other equivalent mechanisms. In an illustrative embodiment, the participating content provider uses an industry-standard FTP client. The system preferably restricts certain FTP operations and mediates others. In outline, the restricted operations are: in-place modification, deletion of directories, create soft links, and rename an existing file. The mediated operations are the following: put, get, ls, cwd, cdup, and user/passwd.

1.2.1 Security:

Preferably, the content storage system upload function supports the use of FTP over SSH tunnels to ensure that at least user name and passwords are encrypted. If desired, the system may offer additional upload mechanisms with additional security. Preferably, a user (i.e., a customer) cannot follow a soft-link out of their assigned directory hierarchy and into another customer's directory. To enforce this constraint, the FTP server explicitly checks all followed soft-links against a customer (cp-code)-specific path prefix to ensure that the soft-link does not step out of bounds. All user passwords and accounts preferably are stored in an XML storage configuration file. Preferably, all files are stored under the same "storage" uid/gid for which no login account should exist. This allows the service provider to control access entirely within its server code.

1.2.2 Availability:

The FTP, HTTP, Rsync, or other upload or download server can run on any (and indeed every) machine in a storage region and a redundant (sometimes referred to as a "buddy") server may be provided to ensure continued service availability in the event that one server fails.

1.2.3 Assumptions:

A metadata transmission system may be used to distribute metadata configuration information to the storage sites including the FTP servers. It is assumed that all such updates will happen "reasonably" atomically across all buddy pairs and all machines in a given storage site.

1.3 Content Download:

Content download preferably is via HTTP and Apache is used as the base WWW server. Apache can run on any (and indeed every) client machine in a storage region. It is augmented preferably by two (2) plug-ins: one is for managing the download process, and the other for reporting monitoring information into an online monitoring function. The download plug-in preferably implements per-directory configuration and security. This information preferably includes: path prefix within which to locate the content for this directory on the NFS filesystem (i.e. the directory in the configuration is relative to this prefix); various security attributes (refer field checking, "green-cookie" authentication); other storage sites on which this content is replicated (i.e. which other domain to redirect request for content). An assumption is made about the relationship of directories to cp- codes, namely that there is a one-to-one correspondence between the directories (not the prefixes) used in the configuration and cp-codes. For example, the configuration file contains entries for directories such as "/345/a" and, preferably, all authentication and replication information pertains to this directory and hence this cp-code. An alternative design has the configuration made on a per CNAME basis with the HTTP host-header being used to key into the configuration. In addition, the above can be easily extended to include authentication based on host-headers and thus restrict access to a given directory tree to a given set of CNAMEs that appear in HTTP host-headers.

If a file does not exist on the local site, then issue an HTTP 307/302 temporary redirect to another site on the list of sites for this domain. The redirection may be round-robin.

1.3.1 Security:

To authenticate a CDN edge server, the system may use a shared secret which is transferred in plaintext or encrypted to the download server via either an HTTP refer field or as an HTTP cookie. If the shared secret is secure, then this implementation ensures that one customer cannot view another's content and that an arbitrary end-user cannot access any content other than via a CDN edge server (on a cache miss). Other security and authentication schemes, such as SSL, may also be used and configured on a per-directory basis.

1.3.2 Availability:

Preferably, any of the HTTP servers can serve any content to any CDN edge server, i.e., preferably they all have access to the same content and hence an edge server can be mapped to any of the servers for a given cp-code. In addition, each (or at least some) of the FTP servers preferably has a buddy server. The intent is that a storage region will continue to function until the very last server is taken down. As noted above, it is assumed that edge servers can follow 307/302 redirects and will also stop after following a fixed number of such redirects. It is also assumed that it will be relatively difficult for a third party to capture the shared secrets as transmitted between CDN edge servers and the storage sites; i.e. it is hard to capture arbitrary traffic flowing through the core of the Internet.

1.4 Replication Downloads:

A special case of content download is that used for replicating content to a remote storage site. A given storage site preferably will pull content from a replica site using HTTP. For this to work, the fetching sites must have access to all content and in particular direct access to the on-disk representation of files. Preferably, a special cookie, called "storage_auth" for convenience, is created for replicating content and is specified in an XML configuration file. This is encoded in HTTP GET requests as a cookie, e.g., called "storage_request." These requests would be subject to an IP ACL check, but would not need a "download=yes" setting to allow content to be pulled from sites that are only used for upload. Such requests may be allowed to access file directly using their storage-system specific names.

Other more secure schemes may be used for edge server to storage site authentication.

The following provides details of an illustrative implementation of the content replication functionality of the content storage system architecture. As noted above, a technical advantage of the storage infrastructure and managed service is the ability to replicate the same content across multiple storage regions. This functionality preferably is divided into two components: a replication engine, which implements the control logic in the system, and a fetch engine, which is used to retrieve content to be replicated from a site that has the content. As noted above, preferably a pull model for actually copying of the data from site to site is used, although this is not a requirement, as a push model may be implemented as well.

2.1 Content Management

The ability to provide users with a virtual view of a potentially limitless filespace is a desired technical advantage of the content storage system. In one embodiment, the content associated with a single cp-code preferably cannot span more than one filesystem that will typically be about 400 Gbytes. To support such a virtual view of the filesystem, a level of indirection may be used to hide the details of how files are actually stored on disk from the user—that is, the customer would always see /cp-code/x/y/z.asx regardless of where z.asx was actually stored. The replication engine is responsible for providing this virtual view and for managing the placement of files on disk. The interface to the replication engine is a library, called repllib for convenience, which is described below.

For this embodiment, a two level directory name scheme may be used. In this way, it possible for a single cp-code to span multiple filesystems, but no single replicated directory is able to do so. Note that each such directory is a unit of replication and is often called the "replication directory" (or the "wvfn root" directory in subsequent discussions). Multiple such directories can have the same cp-code, and the cp-code is explicitly specified per such directory, e.g., in a storage XML configuration file.

Preferably, soft-links are used for all customer-visible files. Thus, preferably each customer accessible file (both for upload and download) is actually a soft-link to the real file. The fact that soft-links are used is hidden behind the repllib API (as described below), and this approach provides implementation flexibility. There are several benefits to using soft-links: updating a soft-link is a safe, atomic, operation over NFS with multiple clients reading the data. In addition, with careful choice of the naming scheme used for the real files, one can avoid the need for a catalogue of what files are stored where and what metadata is associated with each file. For example, the name of the real file may include an MD5 checksum of the contents of that file. Thus, the NFS server is used to store both the content and the metadata associated with that content.

The virtual view seen by a storage customer is called the "world virtual filename" (wvfn), and it may look like "/31/a/movies/foo.mov." The on-disk filename (odfn) contains the actual content, and it may look like the following (which is representative): /mnt/foo/bar/31/a/movies/._foo.mov_blah_ 2398379438483742378234. In this embodiment, the mapping from vwfn to odfn preferably is implemented via soft-links, i.e., the wvfn is a soft-link to the odfn. In this example, the replication directory or wvfn-root is the "31/a" component, the "/mnt/foo/bar" is a local mount point, "movies/foo.mov" is the wvfn "path name" and the "._foo.mov_blah_ 2398379438483742378234" component is called the odfn "file name." Of course, the above naming scheme is merely representative.

2.2 The Replication Library

The storage system includes a programmatic API that enables different upload clients and other applications to manage content. A representative API for repllib is defined generally below and contains operations to perform the following representative functions:

Repllib_init: takes the list of replication engines (i.e. replication engine instances) in this region and a root directory tree as arguments.

Repllib_mkdir: ask for a new directory wvfn to be created.

Repllib_upload_dir: ask for a directory into which to place a newly created, uniquely named file, which will have a specified wvfn.

Repllib_upload_complete: tell the replication engine that the upload of the specified file is complete and that the file had the specified checksum.

Repllib_delete: delete a wvfn.

Repllib_download: request the odfn for the specified wvfn. This hides the implementation details of how the odfn to/from wvfn mapping is implemented.

Repllib_stat—determine the status (i.e. get direct-like info for the specified wvfn).

Repllib_rmdir—delete the specified directory, which must be empty for the operation to succeed.

2.3 Replication:

The replication strategy in this embodiment is preferably simple and is based on the assumption that all storage sites are accessible for the vast majority of the time. Whenever a new file is uploaded to one site, or a file is deleted from one site, that site will immediately (or as soon as reasonably possibly) communicate that event to all of the replica sites for the content so modified. In this way, all sites are kept in synchronization with respect to the content at all others (per replication directory). However, temporary network partitions will occur, servers will be restarted and it is impossible to keep all sites in perfect synchronization. Consequently, each site preferably maintains a persistent log of all of the operations it has performed and which it has been requested to perform. This log is parsed whenever a server is restarted and is used to pick-up where a site left off following a network partition. This is akin to a traditional log-structured filesystem, but one that is replicated.

With some restrictions, replication follows a peer-to-peer model and content can be uploaded to any site that is allocated to a given cp-code at any time. The approach taken is to mirror the filesystem logs at all sites, that is, an update to one site is logged to that site, and to all other replica sites. Each site preferably uses its logs to ensure that it replicates the content at its peers. In addition, preferably the logs are designed so that they can be replayed at each site to reconstruct an identical view of the content. The goal is to ensure all operations are executed in a consistent order across all replica sites; this consistent order may be different to that which the user expected, but it is guaranteed to be consistent.

In addition, timestamps preferably are used to impose a total order on all file operations. That is, all log entries are given a timestamp that is used to ensure that log entries are replayed and acted on in the original order in which they occurred across all sites. This clearly requires that tight clock synchronization be maintained across all storage servers within a site and between servers in different sites. Fortunately, the NTP protocol is able to achieve this with relative ease. Each site preferably runs multiple instances of the replication engine, but only one of these is active at any given time. This is the so-called "leader" and is determined using a stable leader-election protocol; this protocol is stable in the sense that a new leader will not be elected unless the current leader fails.

2.3.1 Storage Log:

As mentioned above, a set of logs preferably are used to record and exchange the state of the system between replication regions. These logs can be replayed in an arbitrary order but are still guaranteed to arrive at the same filesystem state. All changes requested locally preferably are logged locally in the "local action log." All changes made locally are passed on to appropriate remote regions where they are logged in the "remote action log." On restart, at any given region, all local and remote action log entries are replayed and their timestamps are used to determine the total order of the operations contained therein. That is, preferably a later operation takes precedence over an earlier one, and care is taken during replay to ensure that earlier operations when replayed cannot prevent a subsequent later one from being correctly executed (e.g. delete, followed by create). The above algorithm generally is sufficient to ensure the correctness of the system.

To enhance scalability of the solution, several additional data structures may be introduced to reduce the number of log entries that need to be replayed. These structures are identified as: completion database; acknowledgement database; and receive-acknowledgement database. The completion database is used to track a set of log entries that need never to be replayed again. Note that this set need not contain all successfully completed entries, as described below. The acknowledgement database tracks all requests that have been acknowledged to remote region and hence need never be requested from the remote site again. The receive-acknowledgement database tracks all requests that have been acknowledged by a remote region and hence state that need no longer be kept for them—this will allow log entries to be garbage collected. This database is also used to ensure that any operations (such as deletes in no-in-place mode replication) that require synchronization across multiple regions can be implemented. Such operations will not complete until the receive-acknowledgement database says that all remote sites have accepted that they will perform that operation. As used herein, no-in-place mode means that, following a delete operation on a given file, a new file cannot be uploaded under the same name until the system receives confirmation that the given file has been deleted from all of the storage sites.

Each replication engine preferably logs the actions it is asked to perform and its progress in executing those actions. The action log (local and remote) can have a number of different entries. Preferably, there are conceptually two action logs: one for locally-instigated actions and another for remotely-requested actions. Typically, however, there are multiple files that make up each log, and all of these files must be replayed at startup. There is one action log for each replication engine instance in any given region. New action log files preferably are created every time the replication engine starts up unless those files are less than a certain size, in which case an existing one preferably is reused. The completion databases preferably have a simple entry format that refers to the action log file that this completion log entry relates to and the greatest byte offset within the action log for which all prior entries have been successfully executed. Operations beyond the offset may, or may not, have been executed successfully. It is guaranteed that the operation immediately following the offset will have failed or has yet to complete. One completion database can track the progress through multiple action logs. Each time progress on any action log is made, a new version of the completion log is written. The completion databases written to disk preferably are a dump of the replication engine's relevant internal data structures. Again, preferably there is one file per replication engine instance in any given region. In addition, each time the file is to be changed, a new file preferably is created rather than modifying in-place an existing file. This is done to ensure reliability and atomicity of updates. Files older than a given number of minutes are removed; in particular, preferably all files younger than such number of minutes and the youngest one older than such number of minutes is kept; all others are deleted.

Preferably, there is a database instance for each of the following: local completion database—which tracks progress through the local action log; and remote completion database—which tracks progress through the remote action log. The acknowledgement database, as noted above, preferably tracks acknowledgments made by the local region to the remote regions. Each entry preferably refers to a local action log on a remote region and represents the point from which the local region will request log entries from the remote region at startup. The acknowledgements preferably are per replication directory; that is, there is an entry per replication directory giving the offset in the local action as it pertains to that directory. The receive-acknowledgement database tracks the operations in the local action log that have been acknowledged by a remote region to which they need to be replicated. This may be used to enforce "no-in-place" modification, i.e. to refuse a new create operation until a prior delete has been acknowledged by all sites. Alternatively, this database could be used to compress logs and to throw out logs that are no longer needed (taking care to deal correctly with new regions, which will need all the log entries to somehow be made available to them). Again, the entries preferably refer to a replication directory. The entries are the same as the acknowledge database.

Completion databases are not required for operation of the system (except for rcv-ack and no-in-place). They can be removed and the system restarted to recreate them. All of these databases preferably store offsets into either the local and remote action logs (completion database) on this site, or to the local action on a remote site (ack database). Preferably, each instance of the replication engine writes its own version of the above files. This is to ensure that NFS write inconsistencies do not occur. The database files preferably are rewritten every time the database changes, again to ensure consistency in the face of NFS semantics. Certain log entries have non-intuitive semantics, in particular, care needs to be taken to ensure that log entries can be replayed in an arbitrary order and yet still lead to the same outcome. File creation preferably is recursive in the sense that all of the directories leading to that file are created implicitly. This is done to ensure that log entries can be replayed in any order and still arrive at the same result. The <timestamp> component in the filename is used to uniquely identify and to do so in a manner meaningful to a human administrator; a monotonically increasing sequence number could have been used instead. The use of a timestamp within the action log is used to impose a total order on all operations and hence to allow the logs to be replayed in any order and still arrive at the same outcome. For example, it is impossible to reorder a deletion and create that have unique timestamps—the system will check the time of the operations before executing them. In addition, the timestamps so-compared are encoded in the odfn and, preferably, no reliance is made of filesystem level timestamps.

Preferably, timestamps are to one-second granularity and hence there is a good chance that multiple operations will be logged with the same timestamp; the intent is to give creations priority over deletions. This is achieved as follows:

1. During playback, creations are given priority over deletion if the two operations have the same timestamp and files are given priority over directories: thus the order is: (from lowest to highest priority) rmdir/deletion/mkdir/creation.
2. During playback, if multiple create operations have the same timestamp they will be ordered, e.g., by a highest checksum.
3. During upload, if a delete and then a create operation of the same file are received within a one second period by the same replication engine, then they are logged with the same timestamp because the playback code will give priority to creations. The operations are performed as deletion followed by creation.
4. During upload, if a create and then a delete operation of the same file are received within a one second period by the same replication engine then the timestamp for the delete operation is incremented by one second to avoid conflicting with the creation operation. The same logic preferably applies for directories, that is, mkdir will override an rmdir.
5. If the create/delete operations are requested at different sites, then the ordering is arbitrary, but the same order will be implemented across all storage sites.
6. The leader election algorithms (via configurable parameters) ensure that one replication engine cannot be replaced by another engine within the space of a given time, thus ensuring that operations cannot be reordered as described above within one region.

The completion databases represent an optimization in that only entries that follow the byte offset specified in the completion log need to be executed on a restart. If the completion logs are deleted then all of the actions need to be replayed. Preferably, the log files are stored on NFS. If that NFS partition is unavailable, then replication will cease and all file upload and deletion will be unsuccessful. The user may attempt the same operations at a remote site—but the replication to the failed site will not take place until it is repaired.

2.3.2 Replication Algorithm:

The replication algorithm preferably works as follows:
1. The replication engine leader in a given site is informed by the upload server via repllib of a file upload or deletion.
2. Validity checking is performed before this request is recorded to the log: for example, if the install odfn exists, if a filename is being change to/from a directory, deletion does non in-place checking, rmdir checks for empty, checks if the ftp upload took place on the correct partition, and so forth.

3. It updates its local action log.
4. It attempts to execute the operation locally and concurrently with communicating that log entry to the remote replica sites.
5. It returns a status indication to the upload server that is based on the success or failure of the local operation; it does not include any indication of whether the operation was successfully communicated to the remote site or not.
6. The appropriate local completion file will be updated on the successful execution of this operation.
7. On receipt of a notification from a remote site, that replication leader will:
   a. Add the new action to the remote action log.
   b. The received request, which includes the remote action log and the offset within that log, is added to the acknowledgement database. This is used to catch up any missed log entries following a network partition.
   c. On successful completion of the requested remote operation, the remote completion logs will be advanced accordingly.
8. On startup, each replication engine leader will replay its local and remote logs as described above. In addition, it will also request any remote log entries from all remote sites from the point specified in the acknowledgement database for that remote site onward. This has the effect of allowing it to catch up with any missed updates.

The above algorithm has the effect of ensuring that all sites are constantly playing catch-up to each other. Timestamps are used to establish a total order of operations across all sites. This requires that time be tightly synchronized across all sites. The unit of time synchronization limits the rate at which files can be uploaded or deleted. For example, if the unit of time synchronization is one second, then one cannot upload and delete the same file within one second and have predictable results. The approach adopted is to ensure that a consistent result is replication across all sites.

2.3.3 Replication Protocol:

An illustrative replication protocol between replication engines is relatively straightforward. It has two phases, a "start-up" phase which is used to catch with any activity at a remote site and a "duty" phase which consists of receiving and servicing replication requests. The latter is explained first. Each site will request that a remote site replicate content, that the remote site has using the following representative message format: LOG <logname><endoffset><entrylen><entries>. The local site will execute steps 7(a)-7(c) above on receipt of this message for each of the possibly multiple entries specified. The "endoffset" is used to acknowledge this request and is stored in the acknowledgement database. The start-up phase consists of registering interest in certain cp-codes in certain logs and requesting that the above "duty cycle" messages be sent to the local site from a point specified by an offset in that remote log (read from the acknowledgement database). If a single log file contains entries for multiple cp-codes, each site registers its interest in specified cp-codes and also takes on the responsibility for remembering which remote log offsets are relevant for each cp-code.

2.3.4 Leader Election:

The leader election protocol is used to determine which of several replication engines at a given site is going to be the leader for that site. The protocol has two primary goals: to ensure at most one leader at any time, as not having a leader at all is acceptable, but two or more are not; and to ensure that the leader selection is stable and does not change unless the current leader dies or loses contact with the rest of the election candidates. The IP addresses of all of the replication engine candidates preferably are sorted into order and the index in this array is used throughout the leader election algorithm (but not in the messages exchanged). Preferably, replication engines send a UDP message over the backend network to all other members of the candidate set with the following information. Vote—which member of the candidate replication engine gets this candidates vote, this is defined to be either the current leader, or the first candidate in the ordered set of candidates that is willing to be a leader. The vote is actually an IP address for which the sender is casting a vote. It is also possible to abstain as described below. MyTime—the time of this vote—i.e. now for the sender. YourTime—the sender's estimate of the recipient's current time. This is based on the last message received from that receiver by the sender and is used by the receiver to reject delayed messages. The estimate is calculated by looking at the delta between "yourtime" and the receiving candidates local time when it last received a vote from it. This assumes zero network latency for these messages, but the protocol is still correct even in the face of non-zero and arbitrary latency. Willing—set if this engine is willing to be the leader. Each replication engine sends out the above message to every other member of the candidate set. MyTime, Vote and Willing remain constant for these n messages, whereas YourTime changes. The election algorithm implements a time window for which votes may be considered—this is used to reject old votes. In addition, votes are sent out periodically with the added restriction that a candidate cannot change its vote without abstaining for at least one period first plus a delta. Each candidate counts the number of votes it has received for each candidate and the leader is the first and only one encountered with more than half of the votes. The candidate set is statically determined and cannot change without restarting all the candidates. Thus, adding a new replication engine to a storage region will require restarting all the replication engines within that region.

2.3.5 Replication Restrictions:

The principal replication restrictions are as follows. The ordering of operations on the same file that fall within the same timestamp window within a single region is constrained to a default order. The ordering of operations on the same file that span multiple storage regions cannot be determined in advance; however, one ordering will be forced consistently across all storage sites.

2.4 Fetch Engine:

The fetch engine is essentially a wrapper around an HTTP fetch library (e.g., Curl) that knows how to interface with the replication engine. In particular, it contacts the fetch engine leader and waits for instructions on which files to fetch from where. In addition, the engine may publish a table with status of the currently in-progress downloads. The replication may check a computed checksum (e.g., an MD5) for the file so fetched against the checksum that was communicated in the log entry. If this fails, the operation is retried. Preferably, all remote files are fetched using a cookie or other authentication mechanism and are retrieved using the wvfn directory path and the odfn filename. The fetch engine preferably is authenticated with the local storage site using an authentication mechanism.

2.5 Availability:

Although not required, every server in the infrastructure preferably runs an instance of the replication and fetch engine and leader election is used to ensure availability of the service. If a remote site is inaccessible, content upload can continue without interruption since the remote site will optimistically redirect back to this one. In the case of deletion, there is a danger that stale content could be served in this case. This situation may be mitigated by refusing to complete the deletion at the local site until the remote site is available.

3.0 Customer Access:

The content storage system preferably includes an extranet application that operates as a portal to the system. The portal is a 24×7×365 dedicated resource that offers the customer the ability to modify FTP, Rsync or other passwords or authentication credentials and view storage metadata such as replica locations, committed volume of storage (CVS), CP codes, and upload/download domain names. Upon authentication, the user may be redirected to the WWW server; the redirect may include information about cp-codes and the role of the user as HTTP Headers which are used by storage application to get the appropriate information from an associated database. The portal application preferably is responsible for generating the storage configuration file. The correctness of this file is important for the correct operation of the storage system. Consequently, a strong series of checks preferably are implemented to ensure that only valid configurations can ever be generated. The checks occur at several levels.

The present invention provides numerous advantages. By replicating content in multiple locations (thereby putting it closer to edge servers) and using a global traffic management solution to select the optimal location from which to retrieve the content, the invention ensures that content is transferred to CDN edge servers as quickly as possible. Persistent TCP/IP connections between edge servers and content storage locations also enhance performance. The invention also provides a scalable solution. Many terabytes of storage capacity ensure scalability with growth in storage needs, and multiple locations around the Internet ensure scaling with the geographic diversity of the content provider's user base. The system is also highly available due to the use of replication in different locations and on different networks. The outsourced solution also provides ease of storage management, as the solution takes care of equipment purchase, maintenance and upgrades as well as security, reliability and availability. This is attractive to content providers with large amounts of content. Using the invention, there is significantly reduced load on the content provider web servers because the system becomes the home or origin server for the content stored thereon. The content provider's web servers may not even get requests for the content. The inventive solution is cost effective while ensuring high availability and high performance of the content provider's rich media objects and other content. Outsourcing their storage needs enables the content providers to focus on their core businesses without worrying about their storage infrastructure design and management.

Preferably, uploaded content is replicated across multiple storage centers in different locations and within different networks. This ensures fault tolerance for both high performance and high reliability. Content is replicated after file upload to ensure consistency across servers. Upon deletion, the content is automatically purged from all storage centers.

Preferably, redundancy and fault tolerance are built into the components of the storage infrastructure. This is achieved by having redundant servers and network configurations with automatic failover, connectivity to multiple ISPs, high-availability storage hardware, content mirrored to multiple locations, and global traffic management as has been described above.

The invention claimed is:

1. A method of content storage on behalf of participating content providers, comprising:

maintaining a set of storage sites managed by a content delivery network (CDN) service provider distinct from the participating content providers, wherein the storage sites of the set of storage sites are located in different Internet-accessible locations and operate asynchronously and autonomously from one another, wherein each of the given storage sites comprises a network filesystem, a set of one or more client servers, a set of one or more file servers that export the network filesystem to the set of client servers, a content upload process operative on at least one of the client servers, a content replication process operative on at least one of the client servers, and a content download process operative on at least one of the client servers, the service provider also operating a traffic manager that estimates relative connectivity to the storage sites from a set of proxy points, wherein each proxy point is determined by directing a trace route from given storage sites and determining a given point in the Internet where the trace routes intersect, and wherein the relative connectivity is determined by probing each of the proxy points;

for each piece of content identified for upload by a participating content provider, selecting a given upload storage site from the set of storage sites by having the traffic manager resolve a first DNS query without reference to an identifier for the piece of content;

at the given upload storage site identified by resolving the first DNS query, using a content upload process to receive an upload of the piece of content identified by the participating content provider, and using a replication process to store the piece of content received by the content upload process and to initiate replication of the piece of content to at least one other storage site in the set of storage sites;

for each piece of content identified for download by a given server entity, the given server entity being a CDN edge server, selecting a given download storage site from the set of storage sites by having the traffic manager resolve a second DNS query without reference to an identifier for the piece of content, wherein the second DNS query differs from the first DNS query;

at the given download storage site identified by resolving the second DNS query, using a download process to attempt to download the piece of content to the given server entity;

for a given piece of content identified for download by a given server entity that is not then available for download from the given download storage site selected from the set of storage sites, redirecting a request for the given piece of content to one or more of the storage sites, wherein during the redirecting step a redirecting threshold is maintained such that, when the redirecting threshold is met, the given piece of content is then dynamically received from a participating content provider origin server;

maintaining an activity log at each storage site; and at a second storage site, replaying an activity log recorded at a first storage site to synchronize content across the first and second storage sites.

2. The method as described in claim 1 wherein the edge server identifies the piece of content for download upon the occurrence of a cache miss at the edge server.

3. The method as described in claim 1 wherein the edge server communicates with the given download server storage site over a secure connection.

4. The method as described in claim 1 wherein the piece of content is one of: Web content, a media file, and a software file.

5. The method as described in claim 1 wherein the content upload process is a file transfer mechanism.

6. The method as described in claim 1 further including a step of presenting the participating content provider with a top-level directory unique to the participating content provider for the upload.

* * * * *